(12) United States Patent
Katzenberger et al.

(10) Patent No.: US 8,360,693 B2
(45) Date of Patent: Jan. 29, 2013

(54) BORING BAR APPARATUS

(75) Inventors: Michael D. Katzenberger, Florissant, MO (US); Ike C. Schevers, Festus, MO (US); James A. Hammond, Jr., O'Fallon, MO (US); George E. Anderson, Alton, IL (US)

(73) Assignee: The Boeing Company, Chicago, IL (US)

( * ) Notice: Subject to any disclaimer, the term of this patent is extended or adjusted under 35 U.S.C. 154(b) by 975 days.

(21) Appl. No.: 12/413,766

(22) Filed: Mar. 30, 2009

(65) Prior Publication Data
US 2010/0247256 A1  Sep. 30, 2010

(51) Int. Cl.
*B23B 29/02* (2006.01)
(52) U.S. Cl. .......... 408/1 R; 408/233; 408/713
(58) Field of Classification Search .......... 408/199, 408/200, 161, 168, 197, 198, 233, 231, 232, 408/1 R
See application file for complete search history.

(56) References Cited

U.S. PATENT DOCUMENTS

| | | | | |
|---|---|---|---|---|
| 1,062,225 A | * | 5/1913 | Crowley | 408/179 |
| 1,218,992 A | * | 3/1917 | Ford | 408/171 |
| 2,021,349 A | * | 11/1935 | Berg | 408/153 |
| 2,564,460 A | * | 8/1951 | Blanco | 279/6 |
| 3,704,958 A | * | 12/1972 | Gulibon et al. | 408/153 |
| 3,795,454 A | * | 3/1974 | Elchyshyn | 408/197 |
| 4,063,843 A | * | 12/1977 | Barkley et al. | 408/146 |
| 4,101,239 A | * | 7/1978 | Wohlhaupter | 408/182 |
| 4,247,233 A | * | 1/1981 | Kraemer | 408/185 |
| 4,619,564 A | | 10/1986 | Jacobson | |
| 4,632,609 A | * | 12/1986 | Johne | 408/197 |
| 4,830,548 A | * | 5/1989 | Kandarian | 408/1 R |
| 4,880,339 A | * | 11/1989 | Doge | 408/161 |
| 5,304,019 A | | 4/1994 | Klee et al. | |
| 5,368,420 A | | 11/1994 | Gerk et al. | |
| 6,247,878 B1 | * | 6/2001 | Musil et al. | 408/1 R |
| 6,536,998 B2 | * | 3/2003 | Hyatt et al. | 408/147 |
| 2003/0221526 A1 | | 12/2003 | Morson | |
| 2004/0253066 A1 | | 12/2004 | Paul | |
| 2005/0204879 A1 | | 9/2005 | Kwech et al. | |

* cited by examiner

*Primary Examiner* — Daniel Howell
*Assistant Examiner* — Paul M Janeski
(74) *Attorney, Agent, or Firm* — Yee & Associates, P.C.

(57) ABSTRACT

In one advantageous embodiment, an apparatus may comprise a boring bar, a slot, a channel, a centering pin, and an adjustment system. The slot may extend substantially perpendicular to an axis extending through the boring bar. The slot may be configured to receive a cutting unit. The channel may be located within the boring bar extending substantially along the axis. The centering pin may be moveably located within the channel and configured to selectively engage a centering feature in the cutting unit. The adjustment system may be configured to position the centering pin relative to the channel in a plurality of axes.

19 Claims, 8 Drawing Sheets

BORING BAR APPARATUS

BACKGROUND INFORMATION

1. Field

The present disclosure relates generally to manufacturing parts and, in particular, to a method and apparatus for forming holes. Still more particularly, the present disclosure relates to a method and apparatus for increasing the size of an existing hole.

2. Background

In manufacturing parts, holes may be drilled into parts. The holes may be used to install fasteners to connect and/or attach parts to each other. In some cases, a hole may not extend all the way through a part and may be used to receive a bar, a tab, or some other suitable feature on another part.

Holes may be formed in a number of parts using a drill with a drill bit to form a hole in the part. A hole may be formed using multiple steps, depending on the precision needed for the hole. In forming a hole, an initial hole may be drilled. The initial hole may be referred to as a pilot hole. This initial hole may serve as a guide for a larger hole. The initial hole may be enlarged through a process that may be referred to as boring. Boring may be a process of enlarging a hole that has already been drilled and/or cast. Boring may be used to obtain greater accuracy for a diameter of a hole. Boring also may be used to cut and/or form a tapered hole.

A boring process may be carried out using a number of different types of power tools. For example, without limitation, a boring process may be performed using a drill, a lathe, or a boring mill.

A boring bar may be used with the power tool to bore out the hole. In boring a hole, a boring bar may be used to increase the size of the initial hole. A boring bar may be an elongate member having a number of cutting elements.

One type of boring bar may include a cartridge that may be used in the boring bar. The cartridge may have a number of cutting elements. The cartridge may be inserted into a slot in the boring bar.

One type of cartridge used with a boring bar may be a fixed cartridge in which the cartridge may be secured to the boring bar. The fixed cartridge may not require the surface of the hole to be perpendicular with the center line of the hole. This type of cartridge also may be referred to as a Davis-style cartridge.

Another type of cartridge may be a floating cartridge. With a floating cartridge, the cartridge may be allowed some movement within the hole during a boring operation. This movement may allow the cutting element in the cartridge to self center itself in the hole during the boring operation. This type of cartridge may require the surface of the hole to be substantially perpendicular to the centerline of the hole. This floating type of cartridge may also be referred to as a Muskegon-style cartridge.

With the fixed cartridge, the cutters for the cartridge may need to be adjusted with respect to each other and within the cartridge to maintain desired tolerances for boring a hole. For example, a cutting element in a fixed cartridge may need to be set within around plus or minus 0.0005 inches of the opposing cutting element.

This type of adjustment may be very time consuming. Further, adjusting cutting elements may require a set up of a dial and/or digital measurement indicator. Also, with variations in manufacturing, this adjustment of cutting elements may be repeated if the cartridge is removed from the boring bar. Further, these fixed cartridges also may need to be matched to the slot that is present in the boring bar.

With a floating-type cartridge, the amount of adjustment may be reduced as compared to a fixed cartridge. This type of cartridge, however, may be limited in a number of applications because the cartridge may require the surface of the hole to be perpendicular to the centerline of the hole. The floating-type cartridge also may require a precise hole through the center of the boring bar. Depending on the length of the boring bar, this hole may require specialized equipment to form.

When boring holes using cartridges, the expense for boring holes may be increased because of the cost of the cartridges. Further, the cost of manufacturing boring bars for use with a cartridge also may increase with a floating-type cartridge because of the precision through the center of the boring bar that may be needed.

Therefore, it would be advantageous to have a method and apparatus that takes into account one or more of the issues discussed above, as well as possibly other issues.

SUMMARY

In one advantageous embodiment, an apparatus may comprise a boring bar, a slot, a channel, a centering pin, and an adjustment system. The slot may extend substantially perpendicular to an axis extending through the boring bar. The slot may be configured to receive a cutting unit. The channel may be located within the boring bar extending substantially along the axis. The centering pin may be moveably located within the channel and configured to selectively engage a centering feature in the cutting unit. The adjustment system may be configured to position the centering pin relative to the channel in a plurality of axes.

In another advantageous embodiment, an apparatus may comprise a boring bar, a slot, a channel, a centering pin, and an adjustment system. The slot may extend substantially perpendicular to an axis extending through the boring bar. The slot may be configured to receive a cutting unit. The channel may be located within the boring bar extending substantially along the axis. The centering pin may be moveably located within the channel and configured to selectively engage a centering feature in the cutting unit. The position of the centering pin may be capable of placing the cutting unit in one of a locked configuration and a floating configuration. The adjustment system may be configured to position the centering pin relative to the channel in a plurality of axes. The adjustment system may comprise a centering pin retainer, an alignment system, a cutting unit, and a power tool. The centering pin retainer may have a hole substantially aligned with the channel. The centering pin retainer may be capable of moving in the hole relative to the channel to adjust a position of the centering pin relative to the axis. The slot may be capable of receiving the centering pin retainer. The centering pin retainer may have a first threaded channel capable of receiving a centering pin adjustment screw and a second threaded channel capable of receiving a centering pin lock screw. The centering pin adjustment screw may be capable of moving the centering pin within the hole relative to the channel. The centering pin lock screw may be capable of holding the centering pin in a position in the hole relative to the centering feature. The alignment system may be capable of aligning the centering pin retainer within the slot. The alignment system may have a first adjustment screw and a second adjustment screw. The first adjustment screw and the second adjustment screw may be capable of moving the centering pin retainer in a direction substantially perpendicular to the channel. The cutting unit may be a cartridge having a number of cutting elements. The power tool may be configured to hold an end of the boring bar.

In yet another advantageous embodiment, a method is present for boring a hole in a number of parts. A boring bar may be positioned relative to a hole in a number of parts. A slot may extend substantially perpendicular to an axis extending through the boring bar. The slot may be configured to receive a cutting unit. A channel may be located within the boring bar and may extend substantially along the axis. A centering pin may be moveably located within the channel and configured to selectively engage a centering feature in the cutting unit. An adjustment system may be configured to position the centering pin retainer relative to the channel in a plurality of axes. The boring bar may be rotated in the hole. The boring bar may be moved along a centerline axis for the hole while rotating the boring bar.

In yet another advantageous embodiment, a method may be present for boring a hole in a number of aircraft parts. The boring bar may be attached to a power tool. The power tool may be selected from one of a drill, a lathe, and a boring mill. The boring bar attached to the power tool may be positioned relative to a hole in a number of aircraft parts. A slot may extend substantially perpendicular to an axis extending through the boring bar. The slot may be configured to receive a cutting unit. The channel located within the boring bar may extend substantially along the axis. A centering pin may be moveably located within the channel and configured to selectively engage a centering feature in the cutting unit. An adjustment system may be configured to position the centering pin retainer relative to the channel in a plurality of axes. The boring bar may be rotated in the hole. The boring bar may be moved along a centerline axis for the hole while rotating the boring bar with the power tool.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
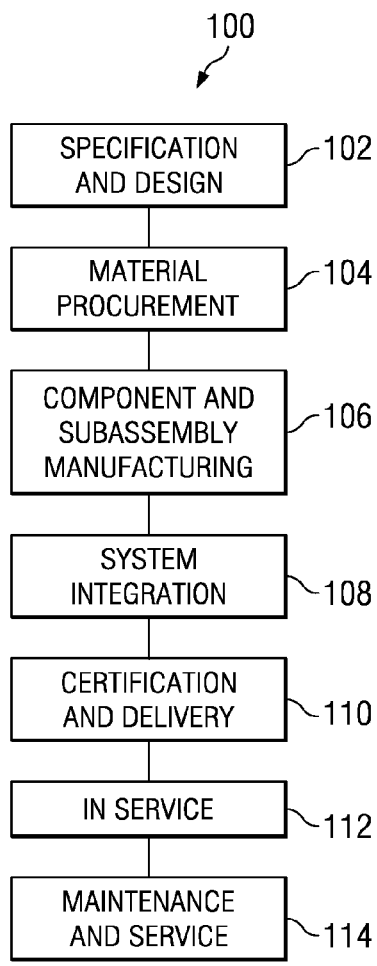
FIG. 1 is an illustration of an aircraft manufacturing and service method in accordance with an advantageous embodiment.
Figure 2:
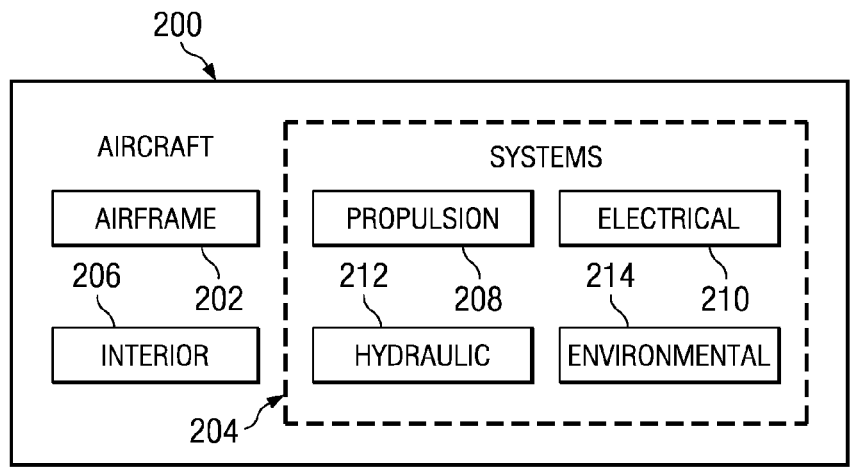
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, one or more of the different advantageous embodiments may be used to bore holes in parts. These parts may be fabricated during component and subassembly manufacturing 106 or during maintenance and service 114.

The different advantageous embodiments recognize and take into account a number of different considerations. For example, the different advantageous embodiments recognize and take into account that the currently available cartridges for use with boring bars may be limiting. For example, the different advantageous embodiments recognize and take into account that the hole through a boring bore for a centering pin may require a high level of precision for the location of the hole.

Further, the different advantageous embodiments recognize and take into account that currently used boring bars may have a hole drilled through the boring bar to the location of the slot for the cartridge for a centering pin. The location of the centering pin within the hole in the boring bar may have tight tolerances.

When a centering pin is placed in the boring hole, a measurement may be made to see how far off the centerline of the pin may be from the centerline for the boring bar. The pin may be ground to obtain the desired centering within the hole.

As a result, the different advantageous embodiments recognize and take into account that a pin from one boring bar may not be usable in another boring bar. As a result, if a pin is damaged, the boring bar may be unusable until a replacement pin can be obtained.

Thus, the different advantageous embodiments recognize and take into account these and other considerations. The different advantageous embodiments provide a method and apparatus for boring a hole. The apparatus may comprise a bar, a slot, a channel, a centering pin, and an adjustment system.

The slot may extend substantially perpendicular to an axis extending through the bar. The slot may be configured to receive a cutting unit. The channel may be located within the bar and extends substantially along the axis extending through the bar. The centering pin may be movably located within the channel and may be configured to selectively engage a centering feature in the cutting unit. The adjustment system may be configured to move the centering pin relative to the channel in a plurality of axes.

Figure 3:
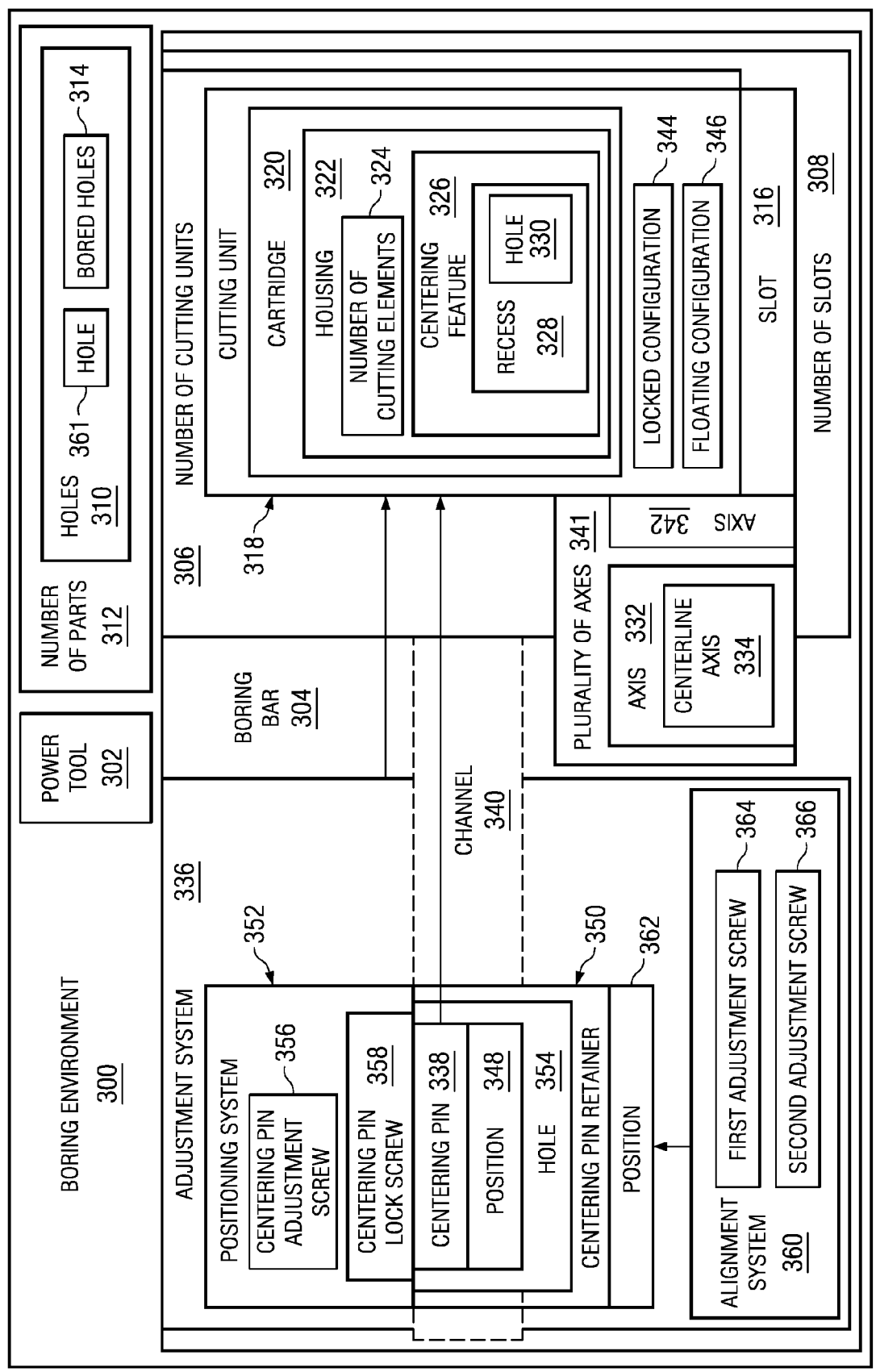
FIG. 3 is an illustration of a boring environment in accordance with an advantageous embodiment.

Turning now to FIG. 3, an illustration of a boring environment is depicted in accordance with an advantageous embodiment. Boring environment 300 may be used to bore holes for parts in aircraft 200 in FIG. 2 in these illustrative examples.

As depicted, boring environment 300 may include power tool 302 and boring bar 304. Boring bar 304 may have number of cutting units 306 positioned within number of slots 308 in boring bar 304. A number, as used herein, with reference to an item refers to one or more items. For example, a number of cutting units may be one or more cutting units.

These components may be used to bore holes 310 in number of parts 312 to form bored holes 314. A number, as used herein, refers to one or more items. For example, a number of parts may be one or more parts. In these examples, number of parts 312 may be, for example, without limitation, an aircraft part. Number of parts 312 may have a plurality of components that may be attached to each other through the installation of fasteners in bored holes 314.

In these illustrative examples, slot 316 in number of slots 308 may receive cutting unit 318. Cutting unit 318 may be, for example, without limitation, cartridge 320. Cartridge 320 may have housing 322, number of cutting elements 324, and centering feature 326. Centering feature 326 for cartridge 320 may be, for example, without limitation, recess 328. Recess 328 may be hole 330 in these examples.

In these illustrative examples, slot 316 may extend and/or be aligned substantially perpendicular to axis 332. Axis 332 may be centerline axis 334 for boring bar 304.

Boring bar 304 also may have adjustment system 336, which may be configured to move centering pin 338 relative to channel 340 extending through boring bar 304. Channel 340 within boring bar 304 may extend substantially along and/or parallel to axis 332.

In these illustrative examples, centering pin 338 may be positioned using adjustment system 336. Adjustment system 336 may position centering pin 338 relative to channel 340 in plurality of axes 341. Plurality of axes 341 may include, for example, without limitation, axis 332 and axis 342. Axis 342 may extend through slot 316 in an orientation substantially perpendicular to axis 332. Centering pin 338 may be located within channel 340.

In the different advantageous embodiments, adjustment system 336 may comprise centering pin retainer 350 and/or positioning system 352. Centering pin retainer 350 may have hole 354 in which centering pin 338 may be located. Positioning system 352 may position centering pin 338 within hole 354 of centering pin retainer 350 in these illustrative examples.

Positioning system 352 may be, for example, without limitation, centering pin adjustment screw 356 and centering pin lock screw 358. Centering pin adjustment screw 356 may move and/or engage centering pin in boring bar 304 in a manner to change position 348 within hole 354 to position centering pin 338 in position around axis 332. Centering pin lock screw 358 may hold, lock, and/or otherwise secure centering pin 338 in position 348.

Further, centering pin retainer 350 also may be adjusted in a direction substantially perpendicular to channel 340. This adjustment may be made using alignment system 360. Alignment system 360 may adjust position 362 of centering pin retainer 350 in a direction substantially perpendicular to channel 340. This direction may be aligned with axis 342 in this example.

Alignment system 360 may include first adjustment screw 364 and second adjustment screw 366. First adjustment screw 364 and second adjustment screw may be adjusted in boring bar 304 to change position for centering pin retainer 350 along an axis, such as axis 342.

When cartridge 320 is placed into slot 316, centering pin 338 may be moved by adjustment system 336 to selectively engage centering feature 326. Based on the position of centering pin 338 along axis 332, centering pin 338 may lock and/or hold cutting unit 318 in place. In other words, when cutting unit 318 is locked in place, cutting unit 318 may not move relative to axis 332. When cutting unit 318 is locked, cutting unit 318 may be referred to as being in locked configuration 344.

Further, centering pin 338 may be positioned by adjustment system 336 to allow cutting unit 318 to float. When cutting unit 318 is allowed to float, cutting unit may be referred to as being in floating configuration 346. When cutting unit 318 is allowed to float, cutting unit 318 may move relative to axis 332.

Although cutting unit 318 may move relative to axis 332, cutting unit 318 may not move out of slot 316 during a boring operation. In other words, cutting unit 318 may move in any direction along axis 342. The amount of movement allowed may depend on position 348 of centering pin 338 relative to centering feature 326 in cutting unit 318.

In this manner, cutting unit 318 may self-center when boring bar 304 is used to bore hole 361 within holes 310. Further, adjustment system 336 also may position centering pin 338 along axis 342. This type of adjustment may allow for centering of cutting unit 318 about axis 332.

Also, by allowing this type of adjustment of centering pin 338, another centering pin may be used to replace centering pin 338 without requiring specific tolerances and/or grinding. In this manner, centering pin 338 may be aligned about axis 332 without requiring special grinding of centering pin 338.

Further, the tolerances for channel 340 also may be greater with the use of adjustment system 336 as compared to the current holes or channels in currently used boring bars.

The illustration of boring environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, boring bar 304 may use different types of cutting units within number of cutting units 306. For example, some cutting units may be in locked configuration 344, while other cutting units may be in floating configuration 346.

The different components in boring bar 304 may be manufactured from a number of different types of materials. For example, without limitation, the different components may be manufactured from materials, such as steel, alloy steel, titanium, and/or some other suitable type of material capable of withstanding loads and/or forces during the boring of holes 310.

As another example, in some advantageous embodiments, alignment system 360 may only employ a single adjustment screw or may use some other positioning mechanism. In another example, centering pin retainer 350 may be held in place with other components. For example, without limitation, adhesives, roll pins, set screws, pressed into the boring bar, welded, swaged, and/or any other mechanical system may be capable of securing and/or positioning centering pin 338 in channel 340.

Figure 4:
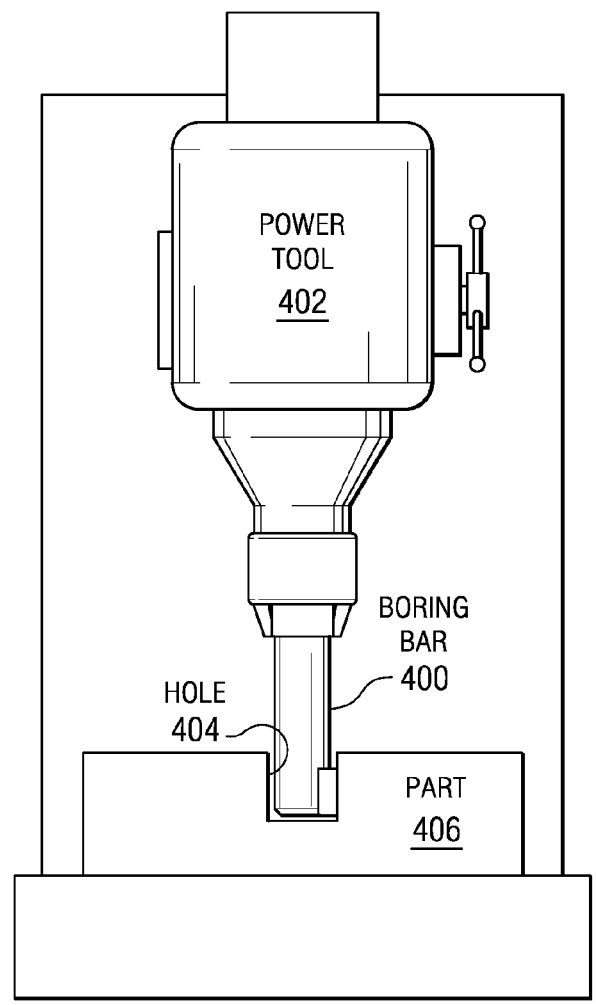
FIG. 4 is an illustration of a power tool and a boring bar in accordance with an advantageous embodiment.

With reference next to FIG. 4, an illustration of a power tool and a boring bar is depicted in accordance with an advantageous embodiment. In this illustrative example, boring bar 400 may be attached to power tool 402. These components are examples of components in boring environment 300 in FIG. 3. Power tool 402 with boring bar 400 may be used to bore hole 404 in part 406.

Figure 5:
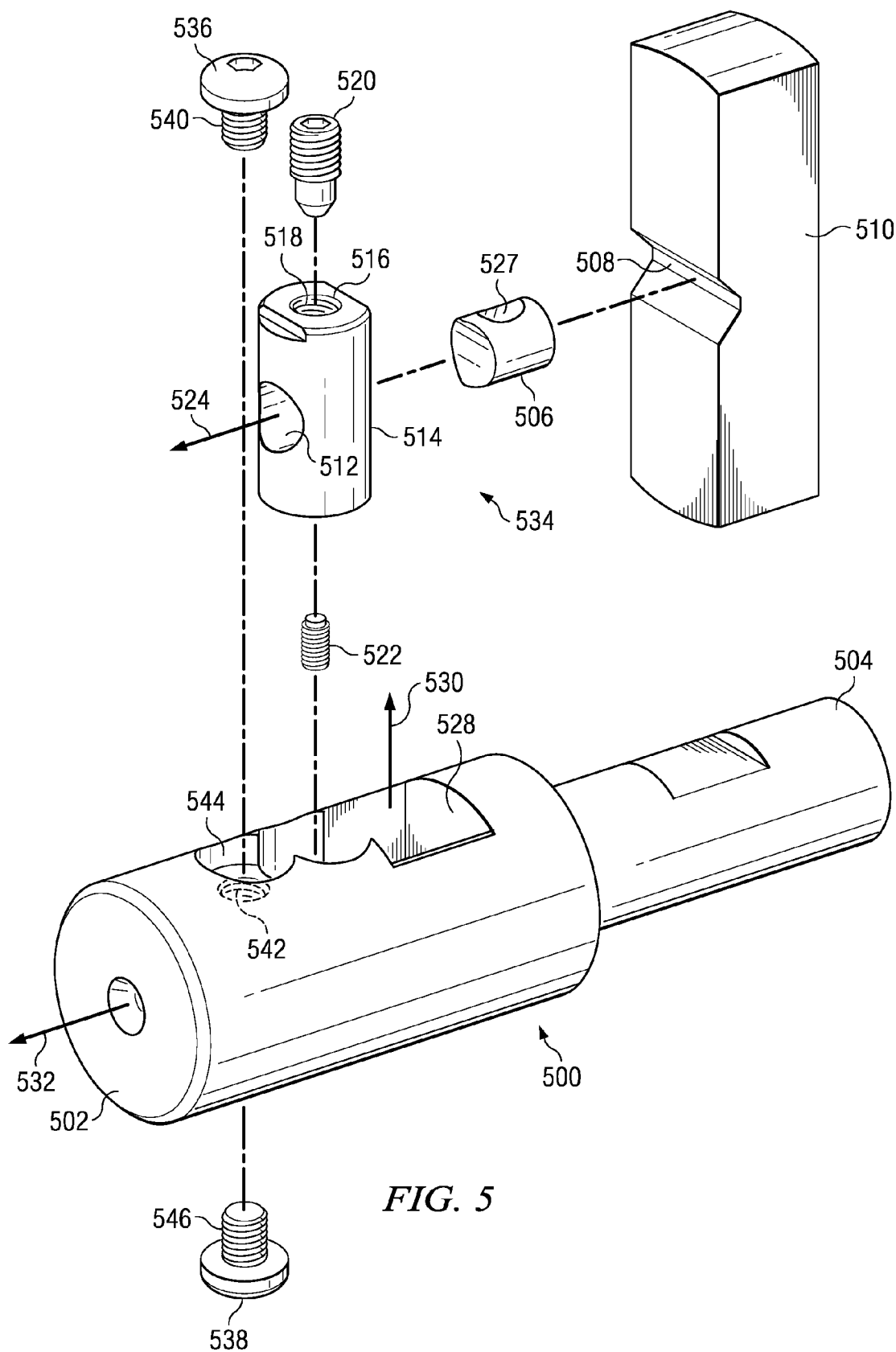
FIG. 5 is an illustration of a boring bar in accordance with an advantageous embodiment.

Turning now to FIG. 5, an illustration of a boring bar is depicted in accordance with an advantageous embodiment. In this illustrative example, boring bar 500 is an example of one implementation of boring bar 304 in FIG. 3. Boring bar 500 is shown in an exploded perspective view in this illustrative example.

Boring bar 500 may have end 502 and end 504. End 504 may be attached to a boring tool, while end 502 may be inserted into a hole to perform a boring operation. In this example, boring bar 500 may have centering pin 506, which may fit into groove 508 in correction block 510. In this illustrative example, centering pin 506 may be placed within hole 512 in centering pin retainer 514.

Additionally, centering pin retainer 514 may have channel 516 containing threads 518. Centering pin adjustment screw 520 and centering pin lock screw 522 may be placed into channel 516 to position centering pin 506 within hole 512 along axis 524 in hole 512. Centering pin lock screw 522 may lock centering pin 506 within hole 512.

In these illustrative examples, correction block 510 may be placed into slot 528 in boring bar 500. Correction block 510 may be used to adjust the position of centering pin 506 prior to inserting cutting unit 318 in FIG. 3 into slot 528. Correction block 510 may be used to adjust centering pin 506 such that number of cutting elements 324 in cutting unit 318 in FIG. 3 may be a substantially equal distance from axis 530 in boring bar 500.

Centering pin retainer 514 also may be placed into slot 528 in these illustrated examples. Centering pin retainer 514 may be adjusted about axis 530, which may be substantially perpendicular to axis 532. Axis 532 may be substantially aligned with axis 524. Axis 532 also may be referred to as a centerline axis. Centering pin retainer 514 may be adjusted along axis 530 in this illustrative example.

Boring bar 500 also may include adjustment system 534, which may comprise first adjustment screw 536 and second adjustment screw 538. First adjustment screw 536 may have threads 540, which may engage threads 542 in hole 544 in boring bar 500. Threads 546 in second adjustment screw 538 also may be secured to threads (not shown) in hole 544.

Figure 6:
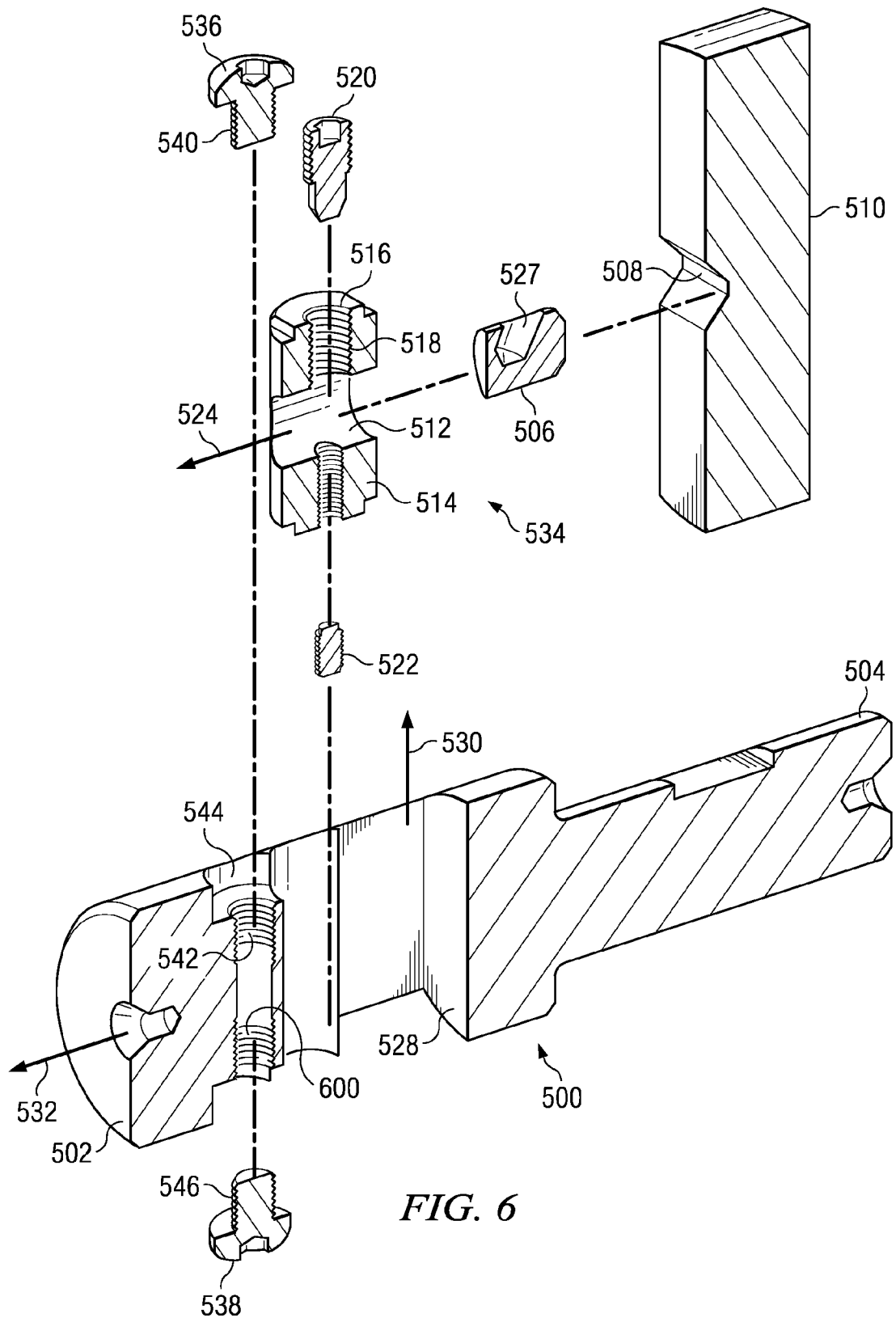
FIG. 6 is an illustration of an exploded cross-sectional view of a boring bar in accordance with an advantageous embodiment.

With reference next to FIG. 6, an illustration of an exploded cross-sectional view of a boring bar is depicted in accordance with an advantageous embodiment. In this illustrative example, threads 600 in hole 544 can be seen in better detail.

Centering pin 506 may have recess 527, which may receive centering pin adjustment screw 520 to position centering pin 506 within hole 512.

Figure 7:
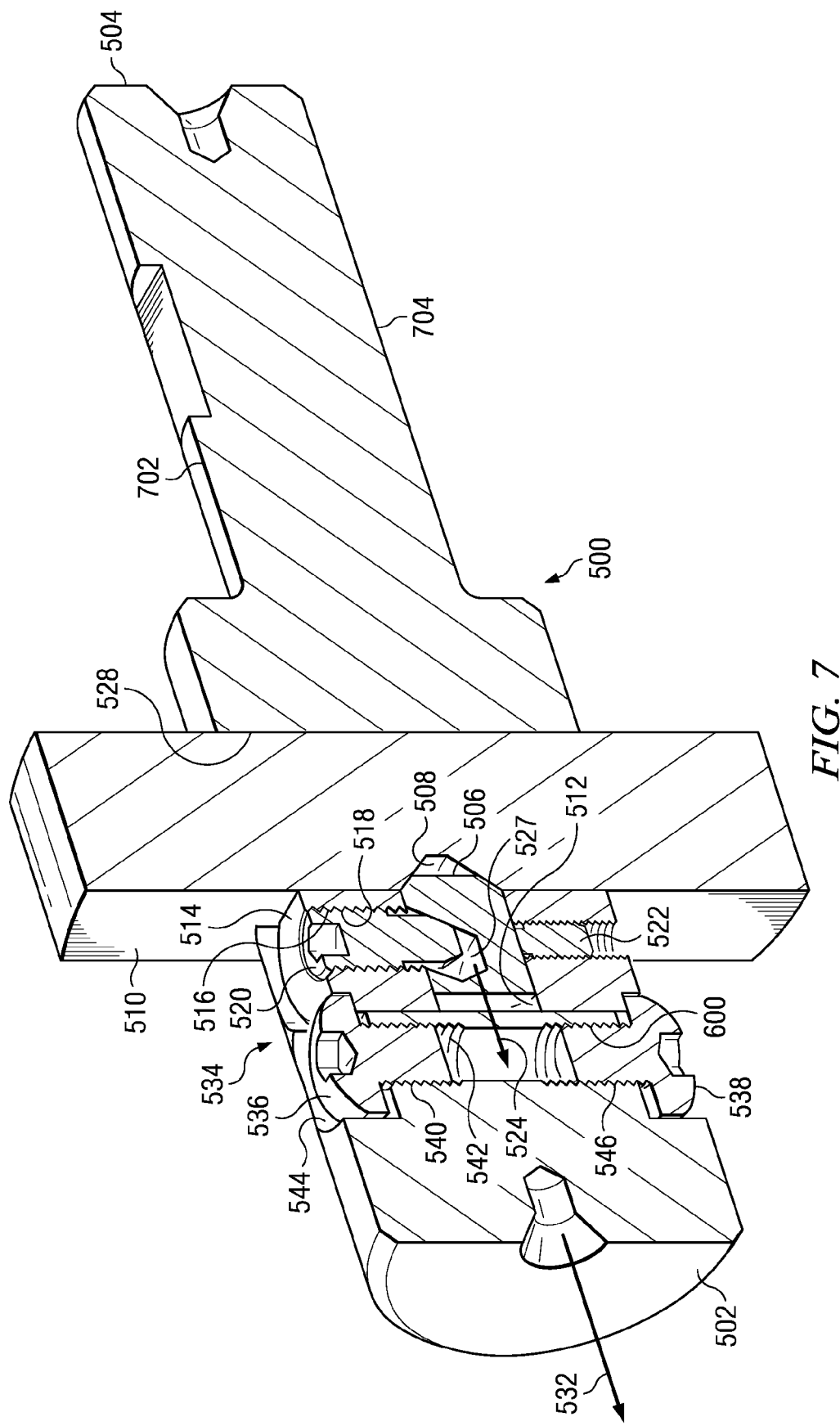
FIG. 7 is an illustration of a cross-sectional perspective view of a boring bar in accordance with an advantageous embodiment.

Turning now to FIG. 7, an illustration of a cross-sectional view of a boring bar is depicted in accordance with an advantageous embodiment. In this example, boring bar 500 is shown in a cross-sectional perspective non-exploded view. In this illustrative example, boring bar 500 may have top side 702 and bottom side 704.

Figure 8:
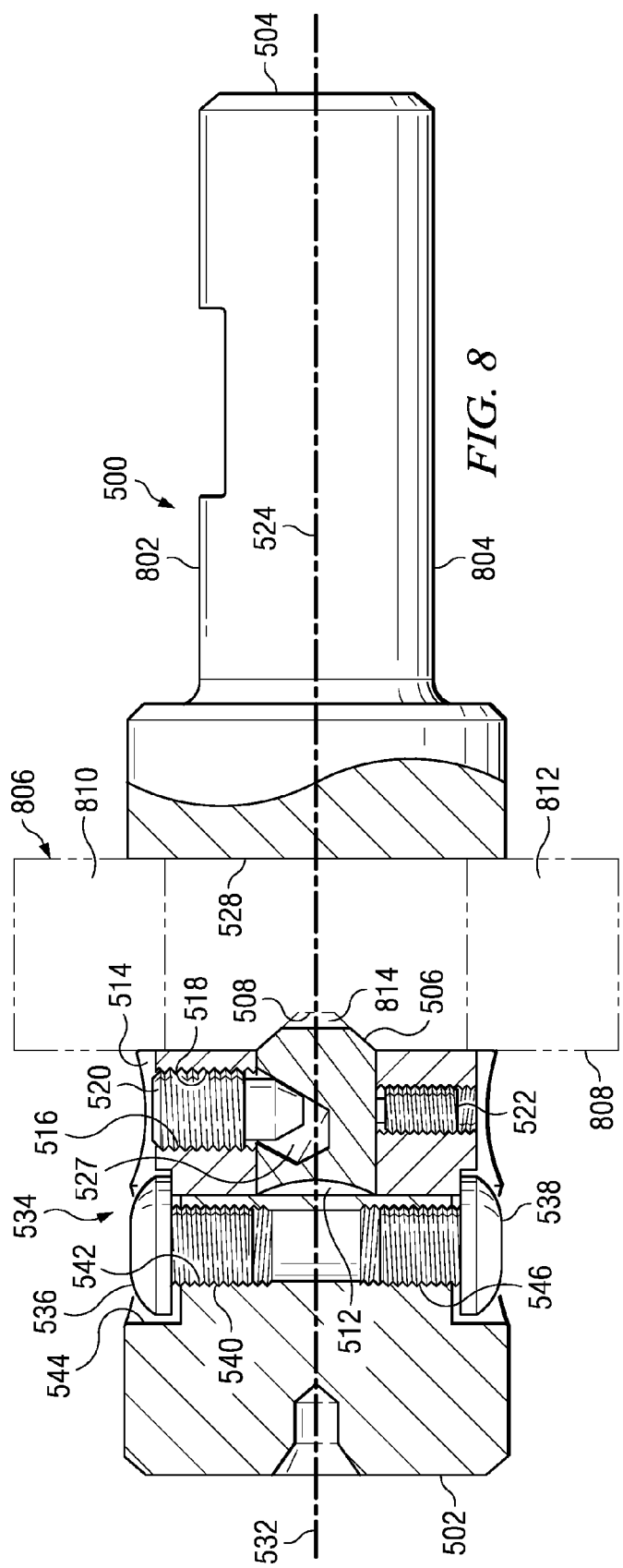
FIG. 8 is an illustration of a boring bar in accordance with an advantageous embodiment.

Turning next to FIG. 8, an illustration of a boring bar is depicted in accordance with an advantageous embodiment. In this figure, boring bar 500 is shown in a partially-exposed side view. Cutting unit 806 may be inserted into slot 528. Cutting unit 806, in this example, may be cartridge 808, which may contain cutting elements 810 and 812. Recess 814 may receive centering pin 506. Centering pin 506 may place cartridge 808 in a locked configuration or a floating configuration, depending on the position of centering pin 506 along the direction of axis 532.

Figure 9:
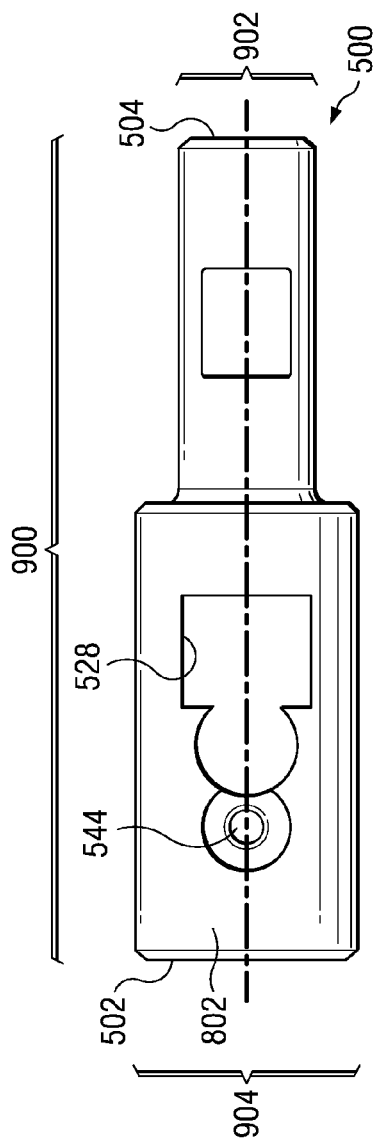
FIG. 9 is an illustration of a top view of a boring bar in accordance with an advantageous embodiment.

With reference next to FIG. 9, an illustration of a top view of a boring bar is depicted in accordance with an advantageous embodiment. In this illustrative example, top side 702 of boring bar 500 may be seen. As can be seen in this illustrative example, boring bar 500 may have length 900.

Length 900 may be around 4.5 inches. End 504 of boring bar 500 may have diameter 902. Diameter 902 may be around 0.750 inches in this illustrative example. Boring bar 500 may have diameter 904 at end 502. Diameter 904 may be around 1.25 inches. Of course, these parameters are only examples of lengths and diameters that may be used for boring bar 500. The different parameters may vary, depending on the particular implementation and use for boring bar 500.

Figure 10:
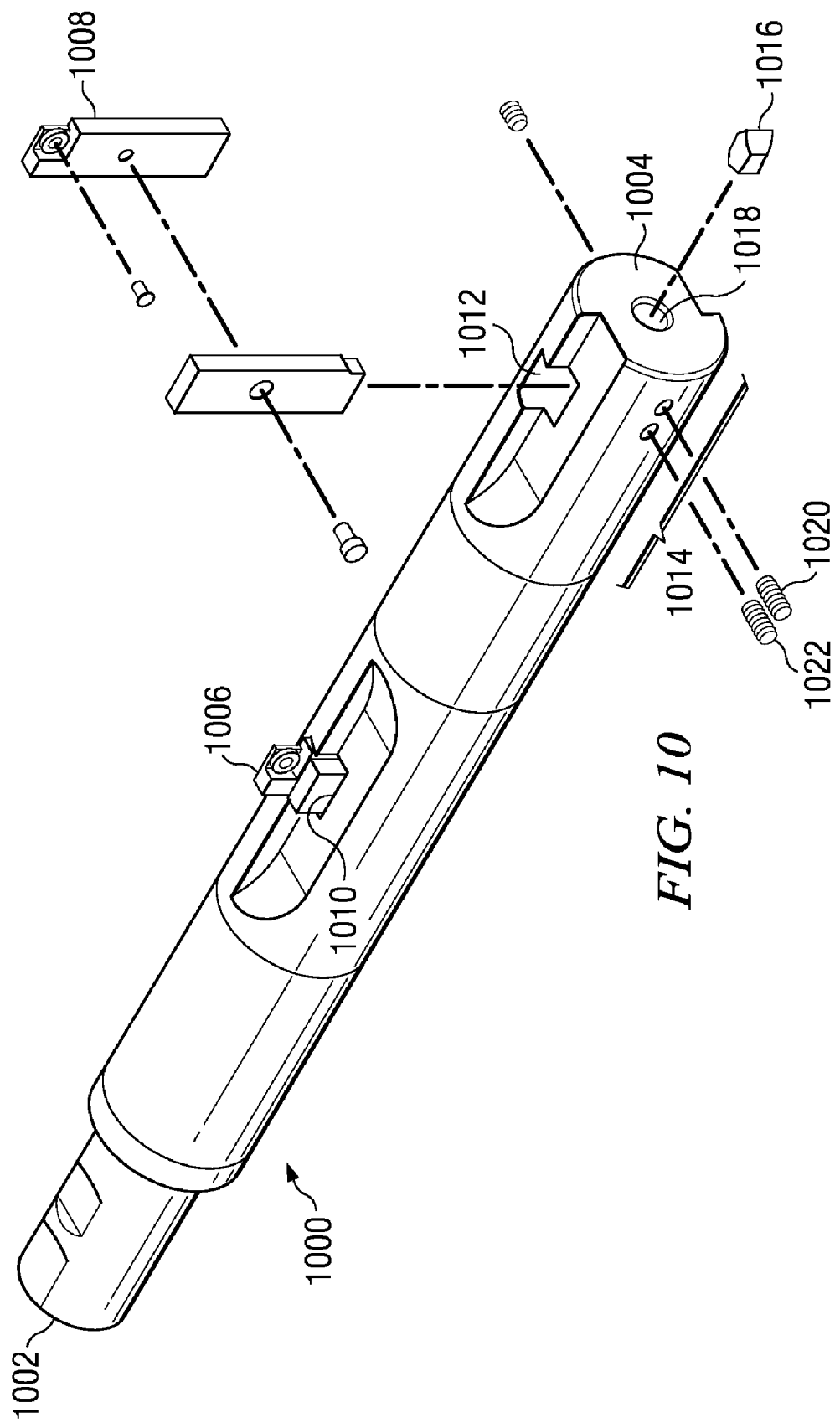
FIG. 10 is an illustration of a boring bar in accordance with an advantageous embodiment.

With reference now to FIG. 10, an illustration of a boring bar is depicted in accordance with an advantageous embodiment. Boring bar 1000 is an example of another implementation of boring bar 304 in FIG. 3. In this illustrative example, boring bar 1000 may have end 1002 and end 1004. End 1002 may be attached to a power tool, such as power tool 402 in FIG. 4, while end 1004 may be placed into a hole, such as hole 404 in FIG. 4.

Further, boring bar 1000 also may be configured to receive cutting unit 1006 and cutting unit 1008. In this illustrative example, cutting unit 1006 and cutting unit 1008 are examples of floating cartridges. Cutting unit 1006 may be received in slot 1010, while cutting unit 1008 may be received in slot 1012 in boring bar 1000.

Section 1014 of boring bar 1000 is shown in an exploded view. Centering pin 1016 may be placed into channel 1018 and may be positioned within channel 1018 using centering pin adjusting screw 1020. Centering pin lock screw 1022 may lock centering pin 1016 in a position within channel 1018. Centering pin 1016 may be positioned to hold cutting unit 1008 inside of slot 1012 in this illustrative example. Another centering pin (not shown) may be present within channel 1018 to engage cutting unit 1006.

Figure 11:
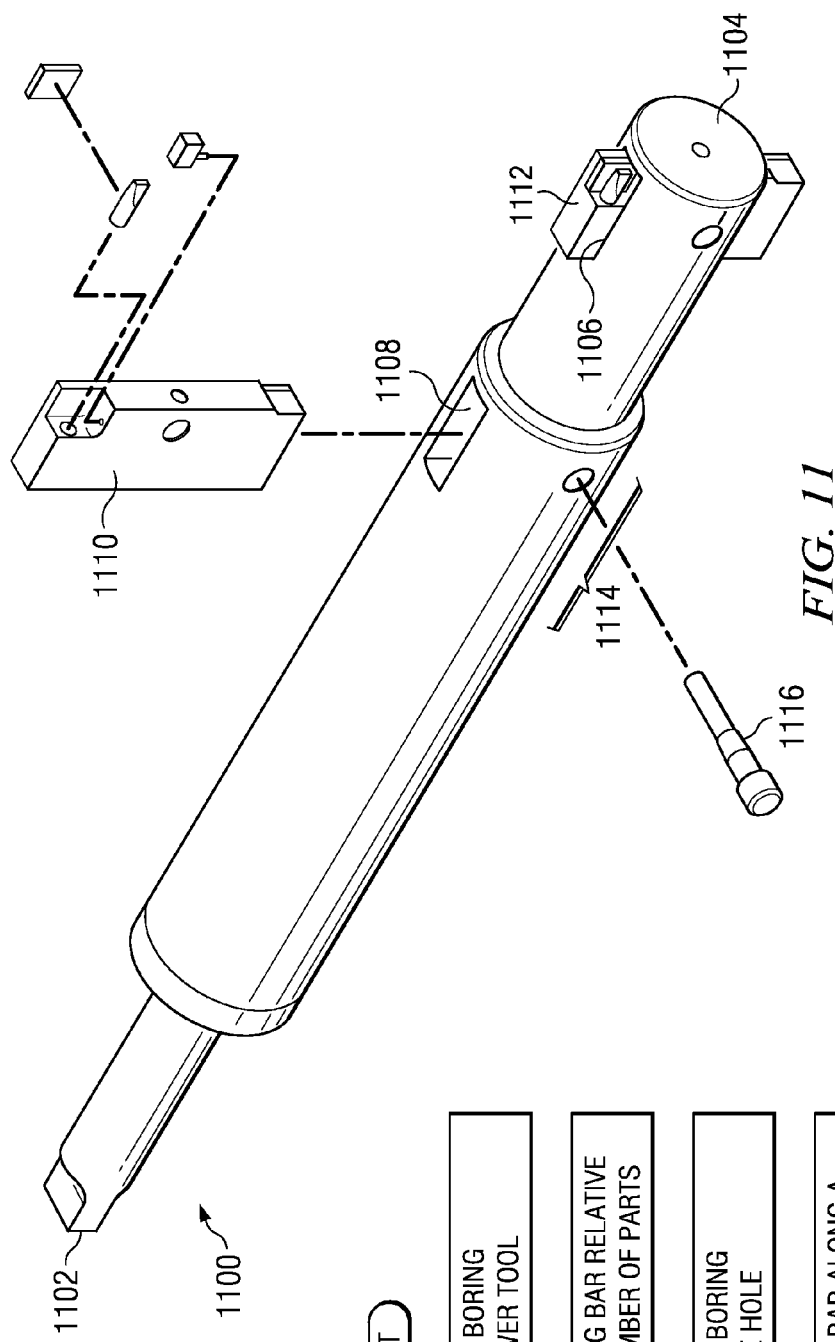
FIG. 11 is an illustration of a boring bar in accordance with an advantageous embodiment.

With reference now to FIG. 11, an illustration of a boring bar is depicted in accordance with an advantageous embodiment. Boring bar 1100 is an example of yet another implementation of boring bar 304 in FIG. 3. In this illustrative example, boring bar 1100 may have end 1102 and end 1104. End 1102 may be attached to power tool 402 in FIG. 4, while end 1104 may be placed into hole 404 in FIG. 4.

Further, boring bar 1100, in this illustrative example, may have slot 1106 and slot 1108. Slot 1108 may receive cutting unit 1110, while slot 1106 may receive cutting unit 1112. In this illustrative example, section 1114 of boring bar 1100 is shown in an exploded view. Cutting unit 1110 may be secured within slot 1108 using pin 1116.

Figure 12:
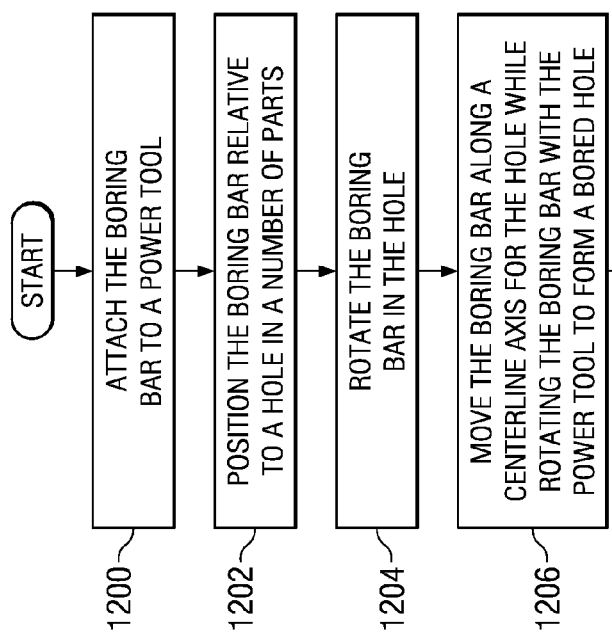
FIG. 12 is an illustration of a flowchart of a process for boring a hole in a number of parts in accordance with an advantageous embodiment.

With reference now to FIG. 12, an illustration of a flowchart of a process for boring a hole in a number of parts is depicted in accordance with an advantageous embodiment. The process illustrated in FIG. 12 may be implemented in boring environment 300 in FIG. 3.

The process may begin by attaching boring bar 304 to power tool 402 (operation 1200). Thereafter, boring bar 304 may be positioned relative to hole 360 in holes 310 in number of parts 312 (operation 1202). Boring bar 304 may be rotated in hole 360 in holes 310 (operation 1204). Boring bar 304 may be moved along a centerline axis for the hole while rotating boring bar 304 with power tool 402 to form a bored hole in bored holes 314 (operation 1206), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, one or more of the different advantageous embodiments provide a method and apparatus for boring holes. With at least some of the advantageous embodiments, boring bars may be less costly to manufacture than currently available boring bars. Also, different boring bars may not be needed for floating cartridges and fixed cartridges. In addition, the time needed to bore holes may be reduced. The time needed to set up cartridges may be reduced to allow for faster boring operations.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, other advantageous embodiments may be applied to other types of objects. For example, without limitation, other advantageous embodiments may be applied to boring holes for parts used in a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a boring bar;
   a slot extending substantially perpendicular to an axis extending through the boring bar, wherein the slot is configured to receive a cutting unit;
   a channel located within the boring bar extending substantially along the axis;
   a centering pin moveably located within the channel and configured to selectively engage a centering feature in the cutting unit; and
   an adjustment system configured to position the centering pin relative to the channel in a plurality of axes, the adjustment system including a centering pin adjustment screw capable of moving the centering pin relative to the channel and a centering pin lock screw capable of securing the centering pin in a direction along the axis in a position relative to the centering feature.

2. The apparatus of claim 1, wherein the adjustment system further comprises:
   a centering pin retainer having a hole substantially aligned with the channel, wherein the centering pin is capable of moving in the hole to adjust a position of the centering pin relative to the axis.

3. The apparatus of claim 2, wherein the position of the centering pin is capable of placing the cutting unit in one of a locked configuration and a floating configuration.

4. The apparatus of claim 2, wherein the slot is capable of receiving the centering pin retainer.

5. The apparatus of claim 2, wherein the centering pin retainer has a first threaded channel capable of receiving a centering pin adjustment screw and a second threaded channel capable of receiving a centering pin lock screw, wherein the centering pin adjustment screw is capable of moving the centering pin in the hole relative to the channel and the centering pin lock screw is capable of holding the centering pin in a position in the hole relative to the centering feature.

6. The apparatus of claim 2, wherein the adjustment system further comprises:
a positioning system capable of securing the centering pin in a position relative to the centering feature in the cutting unit.

7. The apparatus of claim 2, wherein the adjustment system further comprises:
an alignment system capable of aligning the centering pin retainer within the slot.

8. The apparatus of claim 7, wherein the alignment comprises:
a first adjustment screw; and
a second adjustment screw, wherein the first adjustment screw and the second adjustment screw are capable of moving the centering pin retainer in a direction substantially perpendicular to the channel.

9. The apparatus of claim 1 further comprising:
the cutting unit.

10. The apparatus of claim 1, wherein the cutting unit is a cartridge having a number of cutting elements.

11. The apparatus of claim 1 further comprising:
a power tool configured to hold an end of the boring bar.

12. The apparatus of claim 11, wherein the power tool is selected from one of a drill and a milling machine.

13. The apparatus of claim 1, wherein the boring bar is comprised of a material selected from one of steel, titanium, and a steel alloy.

14. An apparatus comprising:
a boring bar;
a slot extending substantially perpendicular to an axis extending through the boring bar, wherein the slot is configured to receive a cutting unit;
a channel located within the boring bar extending substantially along the axis;
a centering pin moveably located within the channel and configured to selectively engage a centering feature in the cutting unit, wherein a position of the centering pin is capable of placing the cutting unit in one of a locked configuration and a floating configuration;
an adjustment system configured to position the centering pin relative to the channel in a plurality of axes, wherein the adjustment system comprises:
a centering pin retainer having a hole substantially aligned with the channel, wherein the centering pin is capable of moving in the hole to adjust a position of the centering pin relative to the axis, wherein the slot is capable of receiving the centering pin retainer, wherein the centering pin retainer has a first threaded channel capable of receiving a centering pin adjustment screw and a second threaded channel capable of receiving a centering pin lock screw, wherein the centering pin adjustment screw is capable of moving the centering pin within the hole relative to the channel and the centering pin lock screw is capable of holding the centering pin in a position in the hole relative to the centering feature;
an alignment system capable of aligning the centering pin retainer within the slot, wherein the alignment system has a first adjustment screw and a second adjustment screw, wherein the first adjustment screw and the second adjustment screw are capable of moving the centering pin retainer in a direction substantially perpendicular to the channel;
the cutting unit, wherein the cutting unit is a cartridge having a number of cutting elements; and
a power tool configured to hold an end of the boring bar.

15. A method for boring a hole in a number of parts, the method comprising:
positioning a boring bar relative to the hole in the number of parts, wherein a slot extends substantially perpendicular to an axis extending through the boring bar, wherein the slot is configured to receive a cutting unit, the boring bar having a channel located within the boring bar and the channel extending substantially along the axis;
adjusting a position of a centering pin relative to the channel, the adjusting including moving a centering pin adjustment screw capable of moving the centering pin relative to the channel and moving a centering pin lock screw capable of securing the centering pin in a direction along the axis in a position relative to the centering feature;
rotating the boring bar in the hole; and
moving the boring bar along a centerline axis for the hole while rotating the boring bar.

16. The method of claim 15 further comprising:
attaching the boring bar to a power tool.

17. The method of claim 16, wherein the power tool is selected from one of a drill, a lathe, and a boring mill.

18. The method of claim 15, wherein a part in the number of parts is for an object selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

19. A method for boring a hole in a number of aircraft parts, the method comprising:
attaching the boring bar to a power tool, wherein the power tool is selected from one of a drill, a lathe, and a boring mill;
positioning a boring bar, attached to the power tool, relative to a hole in a number of aircraft parts, wherein a slot extends substantially perpendicular to an axis extending through the boring bar, the slot is configured to receive a cutting unit, the boring bar having a channel located within the boring bar extending substantially along the axis;
adjusting a position of a centering pin relative to the channel, the adjusting including moving a centering pin adjustment screw capable of moving the centering pin relative to the channel and moving a centering pin lock screw capable of securing the centering pin in a direction along the axis in a position relative to the centering feature;
rotating the boring bar in the hole; and
moving the boring bar along a centerline axis for the hole while rotating the boring bar with the power tool.

* * * * *